US012649431B2

(12) United States Patent
Nakato et al.

(10) Patent No.: US 12,649,431 B2
(45) Date of Patent: Jun. 9, 2026

(54) VEHICLE POWER SUPPLY DEVICE AND DOOR LATCH DEVICE

(71) Applicant: MINEBEA MITSUMI Inc., Nagano (JP)

(72) Inventors: Masakazu Nakato, Hiroshima (JP); Yusuke Takada, Hiroshima (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 18/691,144

(22) PCT Filed: Dec. 20, 2022

(86) PCT No.: PCT/JP2022/046784
§ 371 (c)(1),
(2) Date: Mar. 12, 2024

(87) PCT Pub. No.: WO2023/120501
PCT Pub. Date: Jun. 29, 2023

(65) Prior Publication Data
US 2024/0383422 A1     Nov. 21, 2024

(30) Foreign Application Priority Data

Dec. 23, 2021     (JP) ................................. 2021-209720

(51) Int. Cl.
*B60R 16/033*          (2006.01)
*E05B 81/82*           (2014.01)
(52) U.S. Cl.
CPC ............ *B60R 16/033* (2013.01); *E05B 81/82* (2013.01)
(58) Field of Classification Search
CPC ........ B60R 16/033; B60R 16/03; E05B 81/82
See application file for complete search history.

(56) References Cited

U.S. PATENT DOCUMENTS

2005/0259482 A1*  11/2005  Hourai .................. H02M 3/155
                                                          365/189.06
2011/0187519 A1*   8/2011  Nass ....................... E05B 85/26
                                                          340/438
(Continued)

FOREIGN PATENT DOCUMENTS

JP          2009-144441 A      7/2009
JP          2015-128341 A      7/2015
(Continued)

OTHER PUBLICATIONS

International Search Report for corresponding International Application No. PCT/JP2022/046784 mailed Feb. 21, 2023.
(Continued)

*Primary Examiner* — Lincoln D Donovan
*Assistant Examiner* — Alex W Lam
(74) *Attorney, Agent, or Firm* — Chrisman Gallo Tochtrop LLC

(57)          ABSTRACT

A vehicle power supply device includes a backup power supply to which power is supplied from a battery mounted in the vehicle, a boost unit that boosts a voltage of the backup power supply to a boost voltage, a motor drive unit that is connected to the battery and the boost unit and is capable of driving an electric motor by being supplied with power from either the battery or the boost unit, whichever has a higher voltage, and a control unit that controls operation of the boost unit. When it is determined that a predetermined boost condition is satisfied, the control unit controls the boost unit to boost the voltage of the backup power supply to a voltage higher than a rated voltage of the battery.

8 Claims, 4 Drawing Sheets

(56)                           References Cited

U.S. PATENT DOCUMENTS

2019/0103758 A1 *   4/2019   Fukae ........................ H02J 9/06
2021/0242712 A1 *   8/2021   Izawa ..................... B60R 16/03

FOREIGN PATENT DOCUMENTS

JP         2015231269  A  *  12/2015
JP         2016-092958  A       5/2016
JP         2018-042334  A       3/2018

OTHER PUBLICATIONS

Written Opinion for corresponding International Application No. PCT/JP2022/046784 dated Feb. 21, 2023.

\* cited by examiner

VEHICLE POWER SUPPLY DEVICE AND DOOR LATCH DEVICE

CROSS-REFERENCE TO RELATED APPLICATIONS

This is a national phase application in the United States of International Patent Application No. PCT/JP2022/046784 with an international filing date of Dec. 20, 2022, which claims priority of Japanese Patent Application No. 2021-209720 filed on Dec. 23, 2021, the contents of which are incorporated herein by reference.

TECHNICAL FIELD

The present invention relates to a vehicle power supply device and a door latch device.

BACKGROUND ART

JP-A-2009-144441 discloses a vehicle door lock system that actuates a door lock motor by power supplied from a battery provided on a vehicle-body-side to perform a locking operation and an unlocking operation of a vehicle door. In this system, a backup power supply charged by power from a battery is provided in the vehicle door, and the door lock motor is configured to operate by power supplied from the backup power supply in case where power supply from the battery to the door lock motor is cut off.

SUMMARY OF THE INVENTION

In a power supply device capable of supplying power from a backup power supply to a motor as in the vehicle door lock system of JP-A-2009-144441, the motor always operates by power from the battery in case where the power supply from the battery to the motor is not cut off, that is, in a normal state. However, the voltage of the battery may greatly fluctuate from its rated voltage, and the motor may not be able to be stably operated.

An object of the present invention is to provide a vehicle power supply device capable of stably operating a motor even in case where a voltage of a battery greatly fluctuates.

One aspect of the present invention provides a vehicle power supply device including:

a backup power supply to which power is supplied from a battery mounted in a vehicle;

a boost unit that boosts a voltage of the backup power supply to a boosted voltage;

a motor drive unit that is connected to the battery and the boost unit and is capable of driving an electric motor by being supplied with power from either the battery or the boost unit, whichever has a higher voltage; and a control unit that controls operation of the boost unit, in which when the control unit determines that a predetermined boosting condition is satisfied, the control unit controls the boost unit to boost the voltage of the backup power supply to a voltage higher than a rated voltage of the battery.

According to the present invention, when a predetermined boosting condition is satisfied, the voltage of the backup power supply is boosted to a voltage larger than the rated voltage of the battery, so that power is supplied from the backup power supply to the electric motor. Accordingly, even if the voltage of the vehicle-mounted battery fluctuates, the electric motor can be stably operated by the power from the backup power supply without being affected by the fluctuation.

According to the present invention, a motor can be stably operated even in case where a voltage of a battery greatly fluctuates.

DETAILED DESCRIPTION

Hereinafter, a vehicle power supply device according to an embodiment of the present invention will be described with reference to the accompanying drawings. Note that the following description is merely illustrative in nature, and is not intended to limit the present invention, its application, or its use.

First Embodiment

Figure 1:
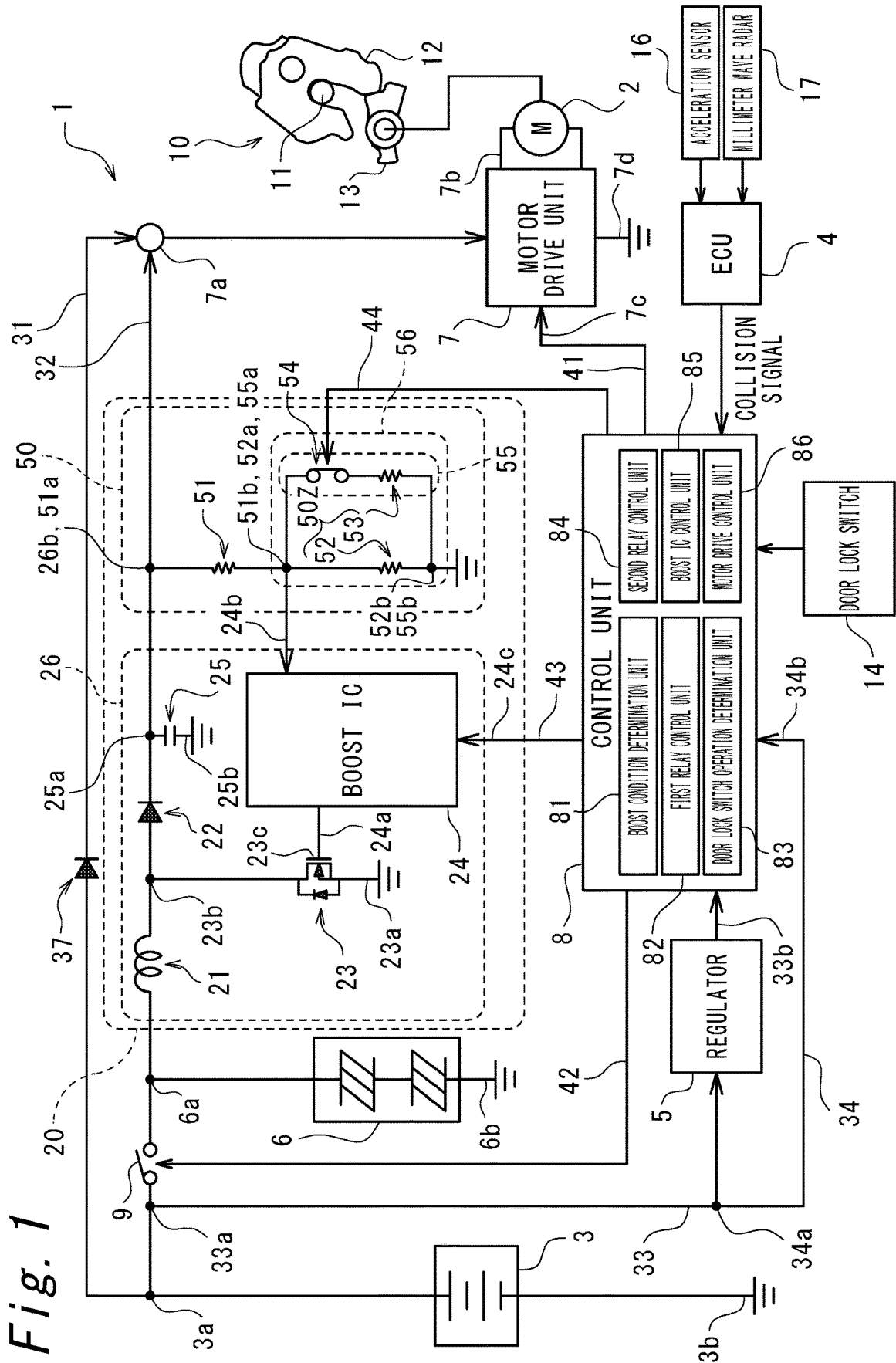
FIG. 1 is a circuit diagram of a vehicle power supply device according to a first embodiment of the present invention.

FIG. 1 is a circuit diagram of a vehicle power supply device 1 according to a first embodiment of the present invention. The vehicle power supply device 1 is a device for supplying power to an electric motor 2 that performs a locking operation and an unlocking operation of a door latch device 10 provided in a vehicle door (not illustrated).

The door latch device 10 includes a fork 12 that is rotatable between a latch position where the fork 12 is in engagement with a striker 11 on the vehicle-body-side and an open position where the engagement is released, and a claw 13 rotatable between a locking position at which the fork 12 is held at the latch position and a locking release position where the locking is released. Further, the vehicle door is provided with a door lock switch 14 for a user to operate the locking operation and the unlocking operation of the door latch device 10. By operating the door lock switch 14, the claw 13 is rotated via the electric motor 2, and thereby the vehicle door is locked or unlocked.

The vehicle power supply device 1 includes a battery 3 provided in a vehicle body. Further, the vehicle power supply device 1 includes, in the vehicle door, a motor drive unit 7 capable of driving the electric motor 2 and a control unit 8 that controls operation of the vehicle power supply device 1. The battery 3 has a rated voltage of DC 12 V.

The battery 3 stores power necessary for operation of the vehicle, supplies the power to vehicle-mounted devices such as a prime mover and an electrical component as necessary, and is charged by, for example, a generator (not illustrated) rotationally driven by the prime mover (not illustrated) or a regenerative brake (not illustrated) when a storage amount decreases. The battery 3 has an output terminal 3a to which the stored power is output, and a ground terminal 3b connected to the ground.

The motor drive unit 7 includes an input terminal 7a to which power is supplied, an output terminal 7b that supplies power to the electric motor 2, a control terminal 7c to which a control signal from the control unit 8 is input, and a ground terminal 7d grounded. The control terminal 7c is connected to the control unit 8 via a first control signal line 41. The motor drive unit 7 supplies power to the electric motor 2 so as to rotate the electric motor 2 forward or backward based on the control signal input to the control terminal 7c.

The output terminal 3a of the battery 3 and the input terminal 7a of the motor drive unit 7 are connected by two lines including a first power supply line 31 and a second power supply line 32 connected in parallel to each other. The first power supply line 31 connects the output terminal 3a of the battery 3 and the input terminal 7a of the motor drive unit 7 via a backflow prevention diode 37, and a voltage output from the battery 3 is supplied to the motor drive unit 7.

On the other hand, a first relay 9, a backup power supply 6, and a boost unit 20 are provided on the second power supply line 32 in order from the side adjacent to the output terminal 3a, and a boost voltage Vb to which the power output from the backup power supply 6 is boosted by the boost unit 20 is supplied to the motor drive unit 7. That is, either the output voltage of the battery 3 supplied via the first power supply line 31 or the boost voltage Vb supplied from the boost unit 20 via the second power supply line 32, whichever has a higher voltage, is supplied to the motor drive unit 7.

The boost unit 20 includes a boost circuit 26 that boosts the voltage of the backup power supply 6 to the boost voltage Vb and a voltage-divide circuit 50 that divides the boost voltage Vb.

The boost circuit 26 includes a coil 21 and a diode 22 provided on the second power supply line 32 in series in order from the side adjacent to the battery 3. The backup power supply 6 is interposed between the first relay 9 and the coil 21 on the second power supply line 32. The backup power supply 6 has one end 6a connected to the second power supply line 32 and another end 6b grounded. The backup power supply 6 is a capacitor in the present embodiment, and is caused to store electric power at a voltage of about 3 V to 5 V DC.

The first relay 9 is connected to the control unit 8 via a second control signal line 42. The first relay 9 is configured to be normally open and is conductive when a control signal is input from the control unit 8. When the first relay 9 is conductive, the backup power supply 6 is conductive with the battery 3 and stores power supplied from the battery 3.

A field effect transistor 23 is interposed between the coil 21 and the diode 22 on the second power supply line 32. The field effect transistor 23 has a source 23a, a drain 23b, and a gate 23c. The source 23a is grounded. The drain 23b is connected to the second power supply line 32. An output terminal 24a of a boost IC 24 is connected to the gate 23c.

The boost IC 24 includes a feedback terminal 24b and a control terminal 24c in addition to the output terminal 24a. A voltage to which the boost voltage Vb is divided by the voltage-divide circuit 50 is input to the feedback terminal 24b as a feedback voltage Vf. The control terminal 24c is connected to the control unit 8 via a third control signal line 43. The boost IC 24 outputs a control signal from the output terminal 24a to the gate 23c based on the control signal from the control unit 8.

Specifically, the field effect transistor 23 is turned on in response to a control signal input to the gate 23c, and conducts between the source 23a and the drain 23b, thereby supplying a current from the backup power supply 6 to the coil 21 to accumulate electric energy in the coil 21 as magnetic energy. Next, the boost IC 24 releases conduction between the source 23a and the drain 23b by turning off the field effect transistor 23, and releases the magnetic energy accumulated in the coil 21 as electric energy.

The boost IC 24 outputs the control signal to the field effect transistor 23 so that the field effect transistor 23 is repeatedly turned on and off as described above, whereby accumulation of energy to the coil 21 and release of energy from the coil 21 are repeated. The boost IC 24 boosts the voltage from the backup power supply 6 until the feedback voltage Vf reaches a predetermined target voltage V0. As a result, the voltage output from the backup power supply 6 is output as the boost voltage Vb.

On the second power supply line 32, a capacitor 25 is interposed on the side adjacent to the motor drive unit 7 with respect to the diode 22. The capacitor 25 has one end 25a connected to the second power supply line 32 and another end 25b grounded. The diode 22 and the capacitor 25 are located on the side adjacent to the motor drive unit 7 with respect to the field effect transistor 23, and thus fluctuation of the boost voltage Vb is suppressed by the diode 22 and the capacitor 25.

As described above, the coil 21, the diode 22, the field effect transistor 23, the boost IC 24, and the capacitor 25 configure the boost circuit 26 that boosts the voltage output from the backup power supply 6 to the boost voltage Vb.

On the second power supply line 32, the voltage-divide circuit 50 is interposed on the side adjacent to the motor drive unit 7 with respect to the capacitor 25. The voltage-divide circuit 50 includes a first resistor 51, a second resistor 52, a third resistor 53, and a second relay 54 (switching element). The first resistor 51 has one end 51a connected to an output terminal 26b of the boost circuit 26, and another end 51b connected to the feedback terminal 24b of the boost IC 24.

The second resistor 52 has one end 52a connected to the other end 51b of the first resistor 51, and another end 52b grounded. The third resistor 53 and the second relay 54 are connected in series to configure a switching circuit 55. The switching circuit 55 is connected in parallel to the second resistor 52. In the present embodiment, the second relay 54 is located closer to the second power supply line 32 than the third resistor 53.

The switching circuit 55 has one end 55a connected to the other end 51b of the first resistor 51, and another end 55b connected to the other end 52b of the second resistor 52. The second relay 54 is connected to the control unit 8 via a fourth control signal line 44. The second relay 54 is configured to be normally closed and is opened when a control signal is input from the control unit 8.

In the voltage-divide circuit 50, when the second relay 54 is closed, the first resistor 51 and a combined resistor 50Z including the second resistor 52 and the third resistor 53 are connected in series. On the other hand, when the second relay 54 is open, the first resistor 51 and the second resistor 52 are connected in series. Here, a resistance value of the combined resistor 50Z is smaller than that of the second resistor 52. As a result, a voltage drop in the first resistor 51 when the second relay 54 is closed is larger than the voltage drop in the first resistor 51 when the second relay 54 is open.

That is, by controlling the close/open of the second relay 54, a voltage-divide ratio indicating a ratio of the resistance value of the first resistor 51 to a total resistance value of the voltage-divide circuit 50 is adjusted, and thus the voltage at the other end 51b can be adjusted. That is, the second resistor 52, the third resistor 53, and the second relay 54 configure a voltage-divide changing circuit 56.

Specifically, when the second relay 54 is closed, the voltage-divide ratio by the first resistor 51 becomes relatively large, so that the voltage (feedback voltage Vf) at the other end 51*b* becomes relatively small. On the other hand, when the second relay 54 is switched to open, the voltage-divide ratio by the first resistor 51 becomes relatively small, so that the voltage (feedback voltage Vf) at the other end 51*b* becomes relatively large.

As described above, since the boost IC 24 adjusts the boost voltage Vb so that the feedback voltage Vf input from the feedback terminal 24*b* becomes a predetermined value, a first boost voltage Vb1 when the second relay 54 is closed becomes larger than a second boost voltage Vb2 when the second relay 54 is open due to the voltage drop in the first resistor 51.

The first resistor 51, the second resistor 52, and the third resistor 53 are set so that the first boost voltage Vb1 is higher than 12 V, which is the rated voltage of the battery 3, and the second boost voltage Vb2 is equal to or higher than a minimum voltage at which the electric motor 2 can operate and smaller than the rated voltage of the battery 3. An operating voltage of the electric motor 2 is equal to or higher than 9 V DC and equal to or lower than 16 V DC.

In the present embodiment, a resistance value R1 of the first resistor 51 is set to 142 kΩ, a resistance value R2 of the second resistor 52 is set to 22 kΩ, a resistance value R3 of the third resistor 53 is set to 40 kΩ, and the target voltage V0 of the feedback voltage Vf is set to 1.274 V DC so that the first boost voltage Vb1 becomes 14 V DC and the second boost voltage Vb2 becomes 9.5 V DC.

Specifically, when the second relay 54 is closed, the resistance value R0 of the combined resistor 50Z including the second resistor 52 and the third resistor 53 is about 14.2 kΩ as calculated by the following expression (1). Therefore, the voltage-divide ratio between the first resistor 51 and the combined resistor 50Z is 142:14.2, and the first boost voltage Vb1 when the feedback voltage Vf becomes the target voltage V0 is calculated to be about 14 V from the following expression (2).

[Math. 1]

$$R0 = \frac{R2 \times R3}{R2 + R3} = \frac{22\,k\Omega \times 40\,k\Omega}{22\,k\Omega + 40\,k\Omega} = 14.194\,k\Omega \quad (1)$$

[Math. 2]

$$Vb1 = V0 \div \frac{R0}{(R1 + R0)} = 1.274\ V \div \frac{14.2\,k\Omega}{(142\ k\Omega + 14.2\ k\Omega)} = \quad (2)$$
$$13.97\ V \approx 14\ V$$

On the other hand, when the second relay 54 is open, the voltage-divide ratio between the first resistor 51 and the second resistor 52 is 142:22, and the second boost voltage Vb2 when the feedback voltage Vf becomes the target voltage V0 is calculated to be about 9.5 V from the following expression (3).

[Math. 3]

$$Vb2 = V0 \div \frac{R2}{(R1 + R2)} = 1.274\ V \div \frac{22\,k\Omega}{(142\,k\Omega + 22\,k\Omega)} = \quad (3)$$
$$9.49\ V \approx 9.5\ V$$

Therefore, the voltage boost IC 24 controls the field effect transistor 23 so that the feedback voltage Vf becomes the target voltage V0 by switching close/open of the second relay 54, whereby the voltage output from the backup power supply 6 can be switched and boosted to the first boost voltage Vb1 or the second boost voltage Vb2.

A third power supply line 33 and a fourth power supply line 34 to which the voltage of the battery 3 is supplied are connected to the control unit 8. The third power supply line 33 supplies operating power from the battery 3 to the control unit 8, and has one end 33*a* connected to the side adjacent to the battery 3 with respect to the first relay 9 on the second power supply line 32, and another end 33*b* connected to the control unit 8. A regulator 5 is interposed in the third power supply line 33, and the power from the battery 3 is stepped down to 5 V and supplied to the control unit 8.

The fourth power supply line 34 has one end 34*a* connected to the side adjacent to the battery 3 with respect to the regulator 5 on the third power supply line 33, and another end 34*b* connected to the control unit 8. Based on the voltage of the battery 3 supplied via the fourth power supply line 34, the control unit 8 determines whether or not the battery 3 is normal, for example, whether battery exhaustion has not occurred, or the like.

Further, a collision signal output from the ECU 4 provided in the vehicle body is input to the control unit 8. In the present embodiment, the ECU 4 determines whether or not the vehicle is in a collision state based on input signals from an acceleration sensor 16 and a millimeter wave radar 17, and outputs a collision signal to the control unit 8 when it is determined that the vehicle is in the collision state or is expected to reach the collision state. The control unit 8 determines whether the vehicle is not in a collision state based on the presence or absence of the collision signal from the ECU 4.

When it is determined that the battery 3 is normal and the vehicle is not in a collision state, the control unit 8 determines that a predetermined boost condition is satisfied. In other words, when at least one of that the battery 3 is normal or that the vehicle is not in a collision state is not determined, the control unit 8 determines that the predetermined boost condition is not satisfied.

Furthermore, a control signal output from the door lock switch 14 is input to the control unit 8. The control unit 8 determines whether or not the door lock switch 14 has been operated based on the control signal from the door lock switch 14.

As described above, the first to fourth control signal lines 41 to 44 are connected to the control unit 8. The control unit 8 outputs a control signal to the motor drive unit 7, the first relay 9, the boost IC 24, and the second relay 54 via the first to fourth control signal lines 41 to 44.

The control unit 8 includes a known computer including a memory, a storage device, and an arithmetic processing unit (CPU), and software implemented in the computer. The control unit 8 includes a boost condition determination unit 81, a first relay control unit 82, a door lock switch operation determination unit 83, a second relay control unit 84, a boost IC control unit 85, and a motor drive control unit 86.

The boost condition determination unit 81 determines that the battery 3 is normal based on the voltage of the battery 3 supplied from the fourth power supply line 34, and determines that the vehicle is not in a collision state based on the presence or absence of the collision signal from the ECU 4. The boost condition determination unit 81 determines whether or not both conditions that the battery 3 is normal and the vehicle is not in a collision state, that is, a predetermined boost condition is satisfied.

The first relay control unit 82 appropriately charges the backup power supply 6 from the battery 3 by conducting the first relay 9. The door lock switch operation determination unit 83 determines whether or not the door lock switch 14 has been operated based on a signal from the door lock switch 14. When the boost condition determination unit 81 determines that the predetermined boost condition is not satisfied, the second relay control unit 84 inputs a control signal to the second relay 54 to open the second relay 54. The boost IC control unit 85 controls the boost IC 24 based on the operation of the door lock switch 14 to boost the voltage of the power output from the backup power supply 6 to the boost voltage Vb. The motor drive control unit 86 controls the motor drive unit 7 to rotate the electric motor 2 forward or backward.

Next, operation of the vehicle power supply device 1 will be described.

First, the control unit 8 causes the first relay control unit 82 to conduct the first relay 9 at a predetermined timing to supply power from the battery 3 to the backup power supply 6. Accordingly, the backup power supply 6 is appropriately charged in preparation for a locking operation or an unlocking operation of the door latch device 10.

When the door lock switch operation determination unit 83 determines that the door lock switch 14 has been operated, the control unit 8 determines by the boost condition determination unit 81 whether or not the predetermined boost condition is satisfied. When it is determined that the predetermined boost condition is satisfied, the boost IC control unit 85 operates the boost IC 24 to boost the voltage output from the backup power supply 6 to the first boost voltage Vb1 so that the feedback voltage Vf becomes the target voltage V0 without controlling the second relay 54 by the second relay control unit 84.

Here, the first boost voltage Vb1 becomes larger than the rated voltage of the battery 3, and thus power is supplied to the motor drive unit 7 at the first boost voltage Vb1. The control unit 8 controls the motor drive unit 7 to operate the electric motor 2 with the first boost voltage Vb1. The fluctuation of the first boost voltage Vb1 is suppressed, so that the electric motor 2 can be stably operated.

On the other hand, in case where the door lock switch operation determination unit 83 determines that the door lock switch 14 has been operated, when the boost condition determination unit 81 determines that the predetermined boost condition is not satisfied, the control unit 8 causes the second relay control unit 84 to open the second relay 54. Next, the boost IC control unit 85 operates the boost IC 24 to step up the voltage output from the backup power supply 6 to the second boost voltage Vb2 so that the feedback voltage Vf becomes the target voltage V0.

At this time, since the predetermined boost condition is not satisfied, the supply of power from the battery 3 is cut off, and power is supplied to the motor drive unit 7 at the second boost voltage Vb2 smaller than the rated voltage of the battery 3. The control unit 8 controls the motor drive unit 7 to operate the electric motor 2 with the second boost voltage Vb2. The fluctuation of the second boost voltage Vb2 is suppressed, so that the electric motor 2 can be stably operated.

With the vehicle power supply device 1 according to the above-described embodiment, the following effects are exhibited.

(1) When the predetermined boost condition is satisfied, the voltage of the backup power supply 6 is boosted to the first boost voltage Vb1 larger than the rated voltage of the battery 3, so that power is supplied from the backup power supply 6 to the electric motor 2. Accordingly, even if the voltage of the battery 3 fluctuates, the electric motor 2 can be stably operated by the power from the backup power supply 6 without being affected by the fluctuation.

(2) When it is determined that the predetermined boost condition is not satisfied, the control unit 8 controls the second relay 54 and the boost IC 24 to boost the voltage of the backup power supply 6 to a voltage lower than the rated voltage of the battery 3 and equal to or higher than a minimum operating voltage of the electric motor 2.

As a result, when the predetermined boost condition is not satisfied, the boost of the backup power supply 6 to an unnecessary size is suppressed, so that the power consumption can be reduced.

(3) The boost unit 20 includes a boost circuit 26 that boosts the voltage of the backup power supply 6 to the boost voltage Vb and a voltage-divide circuit 50 that divides the boost voltage Vb, in which the boost circuit 26 receives an input of a voltage divided by the voltage-divide circuit 50 as a feedback voltage Vf and adjusts the boost voltage Vb so that the feedback voltage Vf becomes a predetermined target voltage V0, and the voltage-divide circuit 50 includes a voltage-divide changing circuit 56 configured to be capable of changing a voltage-divide ratio.

As a result, the feedback voltage Vf is adjusted by change of the voltage-divide ratio, and the boost voltage Vb can be easily adjusted based on the feedback voltage Vf. That is, by providing the voltage-divide circuit 50 with the voltage-divide changing circuit 56, the boost voltage Vb can be boosted to a voltage higher than the rated voltage of the battery 3 at low cost.

(4) The voltage-divide circuit 50 includes the first resistor 51 having one end 51a connected to the output terminal 26b of the boost circuit 26 and the other end 51b connected to the feedback terminal 24b of the boost IC 24, and the second resistor 52 having one end 52a connected to the other end 51b of the first resistor 51 and the other end 52b grounded. The voltage-divide changing circuit 56 includes a switching circuit 55 in which a third resistor 53 and a second relay 54 are connected in series, and is configured so that the switching circuit 55 is connected in parallel to the second resistor 52. The second relay 54 is closed by the control unit 8 when the predetermined boost condition is satisfied, and when the second relay 54 is closed, the first resistor 51, the second resistor 52, and the third resistor 53 set the voltage-divide changing circuit 56 so that the boost voltage Vb becomes larger than the rated voltage of the battery 3.

As a result, the voltage-divide circuit 50 including the voltage-divide changing circuit 56 can be configured at low cost by the first resistor 51, the second resistor 52, the third resistor 53, and the second relay 54. In addition, the voltage-divide ratio can be easily changed by the switching circuit 55.

(5) The control unit 8 is configured to receive a collision signal indicating that the vehicle has collided and a battery state signal with which it is possible to determine the state of the battery 3, and the predetermined boost condition is satisfied when the control unit 8 does not receive the collision signal and when the control unit 8 determines that the battery 3 is not in a failure state or not in a cutoff state based on the battery state signal.

As a result, in a state where power cannot be supplied from the battery 3 to the motor drive unit 7 due to, for example, a collision of the vehicle or a battery exhaustion, since power is supplied from the backup power supply 6 to the motor drive unit 7, it is not necessary to make the boost voltage Vb larger than the rated voltage of the battery 3. By determining that the predetermined boost condition for increasing the boost voltage Vb is satisfied when the collision signal indicating the collision of the vehicle is not received and when it is determined that the battery 3 is not in the failure state and not in the cutoff state, the boost voltage Vb can be made larger than the rated voltage of the battery 3 in an appropriate situation.

Second Embodiment

Figure 2:
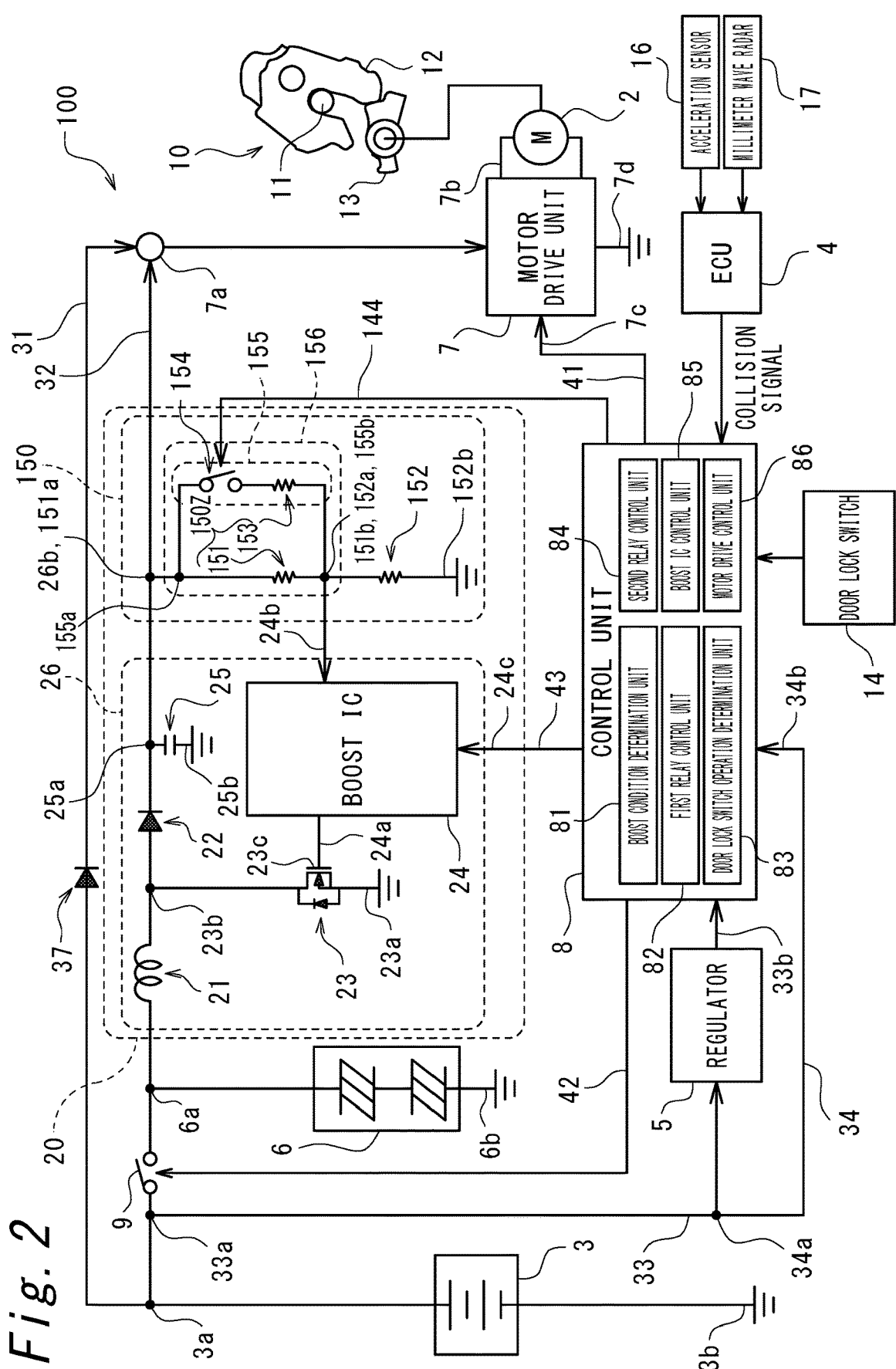
FIG. 2 is a circuit diagram of a vehicle power supply device according to a second embodiment of the present invention.

FIG. 2 is a circuit diagram of the vehicle power supply device 100 according to the second embodiment. The vehicle power supply device 100 according to the second embodiment is configured similarly to the vehicle power supply device 1 according to the first embodiment except that the configuration of the voltage-divide circuit 150 is different. In the following description, the same elements as those of the vehicle power supply device 1 according to the first embodiment are denoted by the same reference numerals, and the description thereof will be omitted.

The voltage-divide circuit 150 is interposed on the second power supply line 32 on the side adjacent to the motor drive unit 7 with respect to the capacitor 25. The voltage-divide circuit 150 includes a first resistor 151, a second resistor 152, a third resistor 153, and a second relay 154 (switching element). The first resistor 151 has one end 151a connected to the output terminal 26b of the boost circuit 26, and another end 151b connected to the feedback terminal 24b of the boost IC 24.

The second resistor 152 has one end 152a connected to the other end 151b of the first resistor 151, and another end 152b grounded. The third resistor 153 and the second relay 154 are connected in series to configure a switching circuit 155. The switching circuit 155 is connected in parallel to the first resistor 151. In the present embodiment, the second relay 154 is located closer to the second power supply line 32 than the third resistor 153.

The switching circuit 155 has one end 155a connected to the one end 151a of the first resistor 151, and another end 155b connected to the other end 151b of the first resistor 151. The second relay 154 is connected to the control unit 8 via a fourth control signal line 144. The second relay 154 is configured to be normally open and is closed when a control signal is input from the control unit 8.

In the voltage-divide circuit 150, when the second relay 154 is open, the first resistor 151 and the second resistor 152 are connected in series. On the other hand, when the second relay 154 is closed, the combined resistor 150Z including the first resistor 151 and the third resistor 153 and the second resistor 152 are connected in series. Here, a resistance value of the combined resistor 150Z is smaller than that of the first resistor 151. As a result, a voltage drop in the combined resistor 150Z (that is, the first resistor 151) when the second relay 154 is open is larger than a voltage drop in the combined resistor 150Z when the second relay 154 is closed.

That is, by controlling the close/open of the second relay 154, a voltage-divide ratio indicating a ratio of the resistance value of the combined resistor 150Z to a total resistance value of the voltage-divide circuit 150 is adjusted, and thus the voltage at the other end 151b can be adjusted. That is, the first resistor 151, the third resistor 153, and the second relay 154 configure a voltage-divide changing circuit 156.

Specifically, when the second relay 154 is open, the voltage-divide ratio by the combined resistor 150Z becomes relatively large, so that the voltage (feedback voltage Vf) at the other end 151b becomes relatively small. On the other hand, when the second relay 154 is switched to be closed, the voltage-divide ratio by the combined resistor 150Z becomes relatively small, so that the voltage (feedback voltage Vf) at the other end 151b becomes relatively large.

As described above, since the boost IC 24 adjusts the boost voltage Vb so that the feedback voltage Vf input from the feedback terminal 24b becomes a predetermined value, the first boost voltage Vb1 when the second relay 154 is open becomes larger than the second boost voltage Vb2 when the second relay 154 is closed, due to the voltage drop in the combined resistor 150Z.

The first resistor 151, the second resistor 152, and the third resistor 153 are set so that the first boost voltage Vb1 is higher than 12 V, which is the rated voltage of the battery 3, and the second boost voltage Vb2 is equal to or higher than the minimum voltage at which the electric motor 2 operates and smaller than the rated voltage of the battery 3. An operating voltage of the electric motor 2 is equal to or higher than 9 V DC and equal to or lower than 16 V DC.

In the present embodiment, a resistance value R21 of the first resistor 151 is set to 220 kΩ, a resistance value R22 of the second resistor 152 is set to 22 kΩ, a resistance value R23 of the third resistor 153 is set to 400 kΩ, and the target voltage V0 of the feedback voltage Vf is set to 1.274 V DC so that the first boost voltage Vb1 becomes 14 V DC and the second boost voltage Vb2 becomes 9.5 V DC.

Specifically, when the second relay 154 is open, the voltage-divide ratio between the combined resistor 150Z and the second resistor 152 is 220:22, and the first boost voltage Vb1 when the feedback voltage Vf becomes the target voltage V0 is calculated to be about 14 V from the following expression (4).

[Math. 4]

$$Vb1 = V0 \div \frac{R22}{(R21 + R22)} = 1.274\,\text{V} \div \frac{22\,\text{k}\Omega}{(220\,\text{k}\Omega + 22\,\text{k}\Omega)} = \tag{4}$$
$$14.014\,\text{V} \approx 14\,\text{V}$$

On the other hand, when the second relay 154 is closed, the resistance value R20 of the combined resistor 150Z including the first resistor and the third resistor is about 142 kΩ as calculated by the following expression (5). Therefore, the voltage-divide ratio between the combined resistor 150Z and the second resistor 152 is 142:22, and the second boost voltage Vb2 when the feedback voltage Vf becomes the target voltage V0 is calculated to be about 9.5 V from the following expression (6).

[Math. 5]

$$R20 = \frac{R21 \times R23}{R21 + R23} = \frac{220\,\text{k}\Omega \times 400\,\text{k}\Omega}{220\,\text{k}\Omega + 400\,\text{k}\Omega} = 141.935\,\text{k}\Omega \tag{5}$$

[Math. 6]

$$Vb2 = V0 \div \frac{R22}{(R20 + R22)} = 1.274\,\text{V} \div \frac{22\,\text{k}\Omega}{(142\,\text{k}\Omega + 22\,\text{k}\Omega)} = \tag{6}$$
$$9.49\,\text{V} \approx 9.5\,\text{V}$$

Therefore, the boost IC 24 controls the field effect transistor 23 so that the feedback voltage Vf becomes the target voltage V0 by switching close/open of the second relay 154, whereby the voltage output from the backup power supply 6 can be switched and boosted to the first boost voltage Vb1 or the second boost voltage Vb2.

The voltage-divide circuit 150 includes the first resistor 151 having one end 151*a* connected to the output terminal 26*b* of the boost circuit 26 and the other end 151*b* connected to the feedback terminal 24*b* of the boost IC 24, and the second resistor 152 having one end 152*a* connected to the other end 151*b* of the first resistor 151 and the other end 152*b* grounded. The voltage-divide changing circuit 156 includes the switching circuit 155 in which the third resistor 153 and the second relay 154 are connected in series. The switching circuit 155 is configured to be connected in parallel to the first resistor 151. The second relay 154 is opened by the control unit 8 when the predetermined boost condition is satisfied, and when the second relay 154 is open, the first resistor 151, the second resistor 152, and the third resistor 153 set the voltage-divide changing circuit 156 so that the first boost voltage Vb1 becomes larger than the rated voltage of the battery 3.

As a result, the voltage-divide circuit 150 including the voltage-divide changing circuit 156 can be configured at low cost by the first resistor 151, the second resistor 152, the third resistor 153, and the second relay 154. In addition, the voltage-divide ratio can be easily changed by the switching circuit 155.

Third Embodiment

Figure 3:
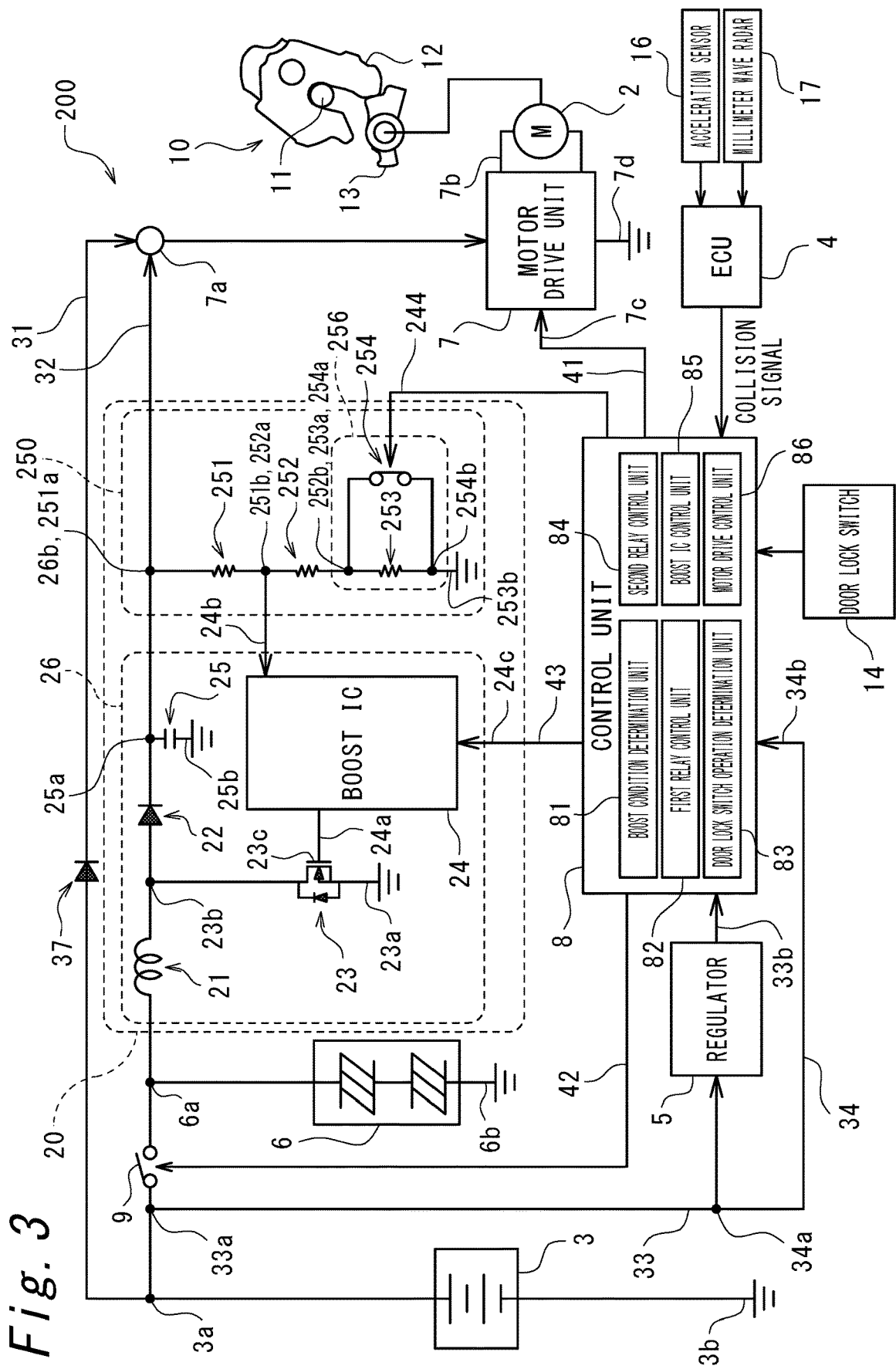
FIG. 3 is a circuit diagram of a vehicle power supply device according to a third embodiment of the present invention.

FIG. 3 is a circuit diagram of a vehicle power supply device 200 according to a third embodiment. The vehicle power supply device 200 according to the third embodiment is configured similarly to the vehicle power supply devices 1 and 100 according to the first embodiment and the second embodiment except that a configuration of a voltage-divide circuit 250 is different. In the following description, the same elements as those of the vehicle power supply device 1 according to the first embodiment are denoted by the same reference numerals, and the description thereof will be omitted.

The voltage-divide circuit 250 is interposed on the second power supply line 32 on the side adjacent to the motor drive unit 7 with respect to the capacitor 25. The voltage-divide circuit 250 includes a first resistor 251, a second resistor 252, a third resistor 253, and a second relay 254 (switching element). The first resistor 251 has one end 251*a* connected to the output terminal 26*b* of the boost circuit 26, and another end 251*b* connected to the feedback terminal 24*b* of the boost IC 24.

The second resistor 252 has one end 252*a* connected to the other end 251*b* of the first resistor 251. The third resistor 253 has one end 253*a* connected to another end 252*b* of the second resistor 252, and another end 253*b* grounded. The second relay 254 is connected in parallel to the third resistor 253. That is, the second relay 254 has one end 254*a* connected to the one end 253*a* of the third resistor 253, and another end 254*b* connected to the other end 253*b* of the third resistor 253.

The second relay 254 is connected to the control unit 8 via a fourth control signal line 244. The second relay 254 is configured to be normally closed and is opened when a control signal is input from the control unit 8.

In the voltage-divide circuit 250, when the second relay 254 is closed, the first resistor 251 and the second resistor 252 are connected in series. On the other hand, when the second relay 254 is open, the first resistor 251, the second resistor 252, and the third resistor 253 are connected in series. As a result, a voltage drop in the first resistor 251 when the second relay 254 is closed is larger than a voltage drop in the first resistor 251 when the second relay 254 is open.

That is, by controlling the close/open of the second relay 254, a voltage-divide ratio indicating a ratio of the resistance value of the first resistor 251 to a total resistance value of the voltage-divide circuit 250 is adjusted, and thus the voltage at the other end 251*b* can be adjusted. That is, the third resistor 253 and the second relay 254 configure a voltage-divide changing circuit 256.

Specifically, when the second relay 254 is closed, the voltage-divide ratio by the first resistor 251 becomes relatively large, so that the voltage (feedback voltage Vf) at the other end 251*b* becomes relatively small. On the other hand, when the second relay 254 is switched to open, the voltage-divide ratio by the first resistor 251 becomes relatively small, so that the voltage (feedback voltage Vf) at the other end 251*b* becomes relatively large.

As described above, since the boost IC 24 adjusts the boost voltage Vb so that the feedback voltage Vf input from the feedback terminal 24*b* becomes a predetermined value, the first boost voltage Vb1 when the second relay 254 is closed becomes larger than the second boost voltage Vb2 when the second relay 254 is open, due to the voltage drop in the first resistor 251.

The first resistor 251, the second resistor 252, and the third resistor 253 are set so that the first boost voltage Vb1 is higher than 12 V, which is the rated voltage of the battery 3, and the second boost voltage Vb2 is equal to or higher than the minimum voltage at which the electric motor 2 operates and smaller than the rated voltage of the battery 3. An operating voltage of the electric motor 2 is equal to or higher than 9 V DC and equal to or lower than 16 V DC.

In the present embodiment, a resistance value R31 of the first resistor 251 is set to 200 kΩ, a resistance value R32 of the second resistor 252 is set to 20 kΩ, a resistance value R33 of the third resistor 253 is set to 11 kΩ, and the target voltage V0 of the feedback voltage Vf is set to 1.274 V DC so that the first boost voltage Vb1 becomes 14 V DC and the second boost voltage Vb2 becomes 9.5 V DC.

Specifically, when the second relay 254 is closed, the voltage-divide ratio between the first resistor 251 and the second resistor 252 is 200:20, and the first boost voltage Vb1 when the feedback voltage Vf becomes the target voltage V0 is calculated to be about 14 V from the following expression (7).

[Math. 7]

$$Vb1 = V0 \div \frac{R32}{(R31 + R32)} = 1.274 \text{ V} \div \frac{20 \text{ k}\Omega}{(200 \text{ k}\Omega + 20 \text{ k}\Omega)} = \quad (7)$$

$$14.014 \text{ V} \approx 14 \text{ V}$$

On the other hand, when the second relay 254 is open, the voltage-divide ratio of the first resistor 251, the second resistor 252, and the third resistor 253 is 200:20:11, and the second boost voltage Vb2 when the feedback voltage Vf becomes the target voltage V0 is calculated to be about 9.5 V from the following expression (8).

[Math. 8]

$$Vb2 = V0 \div \frac{R32 + R33}{(R31 + R32 + R33)} = 1.274 \text{ V} \div \quad (8)$$

$$\frac{20 \text{ k}\Omega + 11 \text{ k}\Omega}{(200 \text{ k}\Omega + 20 \text{ k}\Omega + 11 \text{ k}\Omega)} = 9.493 \text{ V} \approx 9.5 \text{ V}$$

Therefore, the voltage boost IC 24 controls the field effect transistor 23 so that the feedback voltage Vf becomes the target voltage V0 by switching close/open of the second relay 254, whereby the voltage output from the backup power supply 6 can be switched and boosted to the first boost voltage Vb1 or the second boost voltage Vb2.

That is, the voltage-divide circuit 250 includes the first resistor 251 having one end 251*a* connected to the output terminal 26*b* of the boost circuit 26 and the other end 251*b* connected to the feedback terminal 24*b* of the boost IC 24, the second resistor 252 having one end 252*a* connected to the other end 251*b* of the first resistor 251, and the third resistor 253 having one end 253*a* connected to the other end 252*b* of the second resistor 252 and the other end 253*b* grounded. The voltage-divide changing circuit 256 includes the second relay 254. The second relay 254 is configured to be connected in parallel to the third resistor 253. The second relay 254 is closed by the control unit 8 when the predetermined boosting condition is satisfied, and when the second relay 254 is closed, the first resistor 251, the second resistor 252, and the third resistor 253 set the voltage-divide changing circuit 256 so that the first boost voltage Vb1 becomes larger than the rated voltage of the battery 3.

As a result, the voltage-divide circuit 250 including the voltage-divide changing circuit 256 can be configured at low cost by the first resistor 251, the second resistor 252, the third resistor 253, and the second relay 254. In addition, the voltage-divide ratio can be easily changed by the second relay 254. Note that, since the first resistor 251, the second resistor 252, and the third resistor 253 are not connected in parallel to each other regardless of whether the second relay 254 is closed or opened, it is not necessary to consider a combined resistor, and it is easier to configure the circuit.

Note that the second relay 254 may be provided in parallel to the second resistor 252 instead of to the third resistor 253. In this case, the first boost voltage Vb1 and the second boost voltage Vb2 according to the above embodiment can be achieved by setting the resistance value R31 of the first resistor 251 to 200 kΩ, setting the resistance value R32 of the second resistor 252 to 11 kΩ, and setting the resistance value R33 of the third resistor 253 to 20 kΩ. Specifically, when the second relay 254 is closed, the voltage output from the backup power supply 6 can be boosted to the first boost voltage Vb1. When the second relay 254 is open, the voltage output from the backup power supply 6 can be boosted to the second boost voltage Vb2.

Fourth Embodiment

Figure 4:
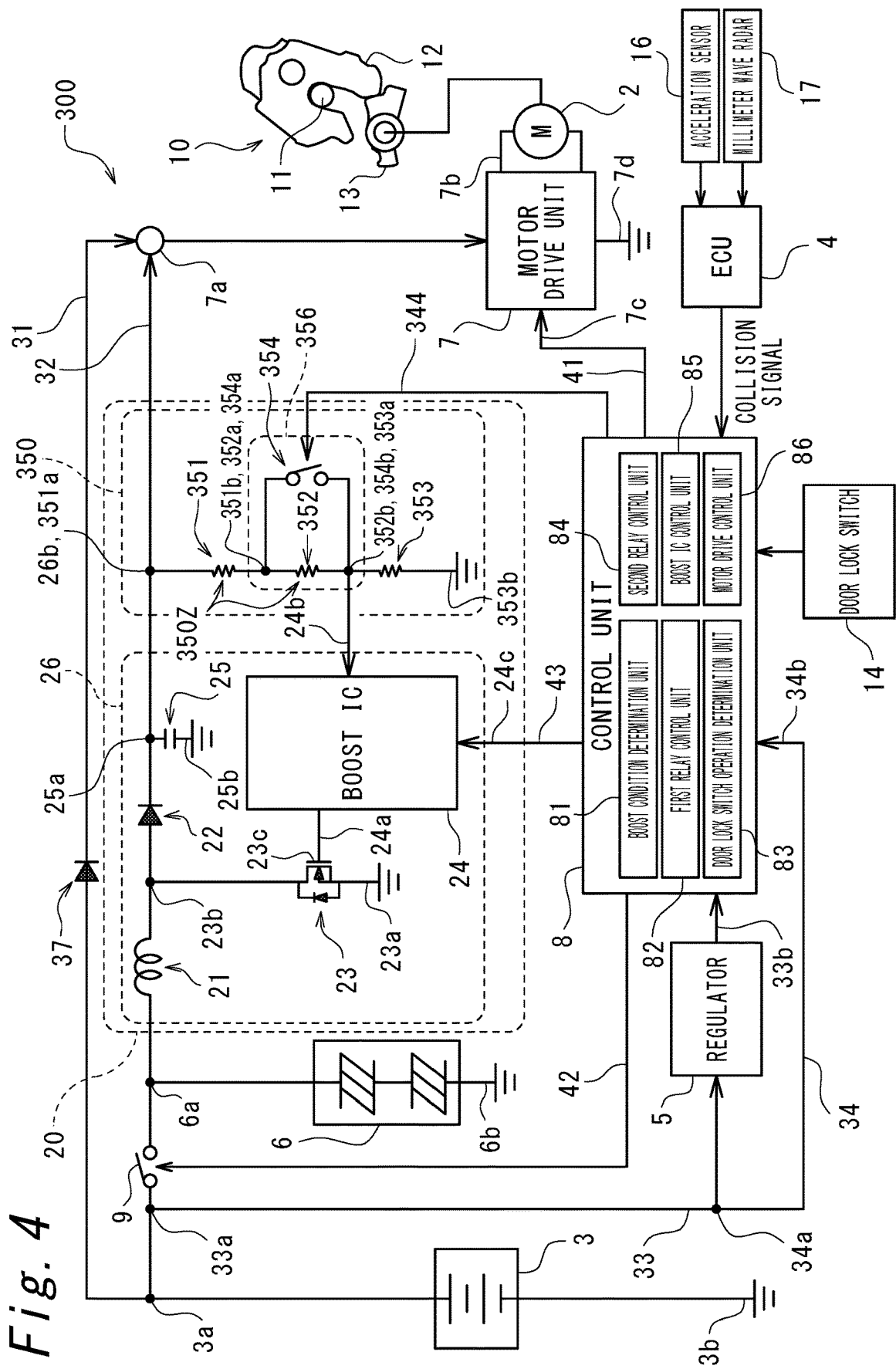
FIG. 4 is a circuit diagram of a vehicle power supply device according to a fourth embodiment of the present invention.

FIG. 4 is a circuit diagram of a vehicle power supply device 300 according to a fourth embodiment. The vehicle power supply device 300 according to the fourth embodiment is configured similarly to the vehicle power supply devices 1, 100, and 200 according to the first, second, and third embodiments except that a configuration of a voltage-divide circuit 350 is different. In the following description, the same elements as those of the vehicle power supply device 1 according to the first embodiment are denoted by the same reference numerals, and the description thereof will be omitted.

The voltage-divide circuit 350 is interposed on the second power supply line 32 on the side adjacent to the motor drive unit 7 with respect to the capacitor 25. The voltage-divide circuit 350 includes a first resistor 351, a second resistor 352, a third resistor 353, and a second relay 354 (switching element). The first resistor 351 has one end 351*a* connected to the output terminal 26*b* of the boost circuit 26.

The second resistor 352 has one end 352*a* connected to another end 351*b* of the first resistor 351, and another end 352*b* connected to the feedback terminal 24*b* of the boost IC 24. The third resistor 353 has one end 353*a* connected to the other end 352*b* of the second resistor 352, and another end 353*b* grounded. The second relay 354 is connected in parallel to the second resistor 352. That is, the second relay 354 has one end 354*a* connected to the one end 352*a* of the second resistor 352, and another end 354*b* connected to the one end 353*a* of the third resistor 353.

The second relay 354 is connected to the control unit 8 via a fourth control signal line 344. The second relay 354 is configured to be normally open and is closed when a control signal is input from the control unit 8.

In the voltage-divide circuit 350, when the second relay 354 is closed, the first resistor 351 and the third resistor 353 are connected in series. On the other hand, when the second relay 354 is open, the first resistor 351, the second resistor 352, and the third resistor 353 are connected in series. As a result, the voltage drop in the combined resistor 350Z including the first resistor 351 and the second resistor 352 when the second relay 354 is open is larger than the voltage drop in the combined resistor 350Z (that is, the first resistor 351) when the second relay 354 is closed.

That is, by controlling the close/open of the second relay 354, a voltage-divide ratio indicating a ratio of the resistance value of the combined resistor 350Z to a total resistance value of the voltage-divide circuit 350 is adjusted, and thus the voltage at the other end 352*b* can be adjusted. That is, the second resistor 352 and the second relay 354 configure a voltage-divide changing circuit 356.

Specifically, when the second relay 354 is open, the voltage-divide ratio by the combined resistor 350Z becomes relatively large, so that the voltage (feedback voltage Vf) at the other end 352*b* becomes relatively small. On the other hand, when the second relay 354 is switched to the closed state, the voltage-divide ratio by the combined resistor 350Z becomes relatively small, so that the voltage (feedback voltage Vf) at the other end 352*b* becomes relatively large.

As described above, since the boost IC 24 adjusts the boost voltage Vb so that the feedback voltage Vf input from the feedback terminal 24*b* becomes a predetermined value, the first boost voltage Vb1 when the second relay 354 is open becomes larger than the second boost voltage Vb2 when the second relay 354 is closed, due to the voltage drop in the combined resistor 350Z.

The first resistor 351, the second resistor 352, and the third resistor 353 are set so that the first boost voltage Vb1 is higher than 12 V, which is the rated voltage of the battery 3, and the second boost voltage Vb2 is equal to or higher than the minimum voltage at which the electric motor 2 operates and smaller than the rated voltage of the battery 3. An operating voltage of the electric motor 2 is equal to or higher than 9 V DC and equal to or lower than 16 V DC.

In the present embodiment, a resistance value R41 of the first resistor 351 is set to 130 kΩ, a resistance value R42 of the second resistor 352 is set to 68 kΩ, a resistance value R43 of the third resistor 353 is set to 20 kΩ, and the target voltage V0 of the feedback voltage Vf is set to 1.274 V DC so that the first boost voltage Vb1 becomes 14 V DC and the second boost voltage Vb2 becomes 9.5 V DC.

Specifically, when the second relay 354 is open, the voltage-divide ratio between the combined resistor 350Z and the third resistor 353 is 218:20, and the first boost voltage Vb1 when the feedback voltage Vf becomes the target voltage V0 is calculated to be about 14 V from the following expression (9).

[Math. 9]

$$Vb1 = V0 \div \frac{R43}{(R41 + R42 + R43)} = 1.274\,\text{V} \div \qquad (9)$$

$$\frac{20\,\text{k}\Omega}{(130\,\text{k}\Omega + 68\,\text{k}\Omega + 20\,\text{k}\Omega)} = 13.889\,\text{V} \approx 14\,\text{V}$$

On the other hand, when the second relay 354 is closed, the voltage-divide ratio between the combined resistor 350Z and the third resistor 353 is 130:20, and the second boost voltage Vb2 when the feedback voltage Vf becomes the target voltage V0 is calculated to be about 9.5 V from the following expression (10).

[Math. 10]

$$Vb2 = V0 \div \frac{R43}{(R41 + R43)} = 1.274\ \text{V} \div \frac{20\ \text{k}\Omega}{(130\ \text{k}\Omega + 20\ \text{k}\Omega)} = \qquad (10)$$

$$9.555\,\text{V} \approx 9.5\ \text{V}$$

Therefore, the voltage boost IC 24 controls the field effect transistor 23 so that the feedback voltage Vf becomes the target voltage V0 by switching close/open of the second relay 354, whereby the voltage output from the backup power supply 6 can be switched and boosted to the first boost voltage Vb1 or the second boost voltage Vb2.

That is, the voltage-divide circuit 350 includes the first resistor 351 having one end 351a connected to the output terminal 26b of the boost circuit 26, the second resistor 352 having one end 352a connected to the other end 351b of the first resistor 351 and the other end 352b connected to the feedback terminal 24b of the boost IC 24, and the third resistor 353 having one end 353a connected to the other end 352b of the second resistor 352 and the other end 353b grounded. The voltage-divide changing circuit 356 includes the second relay 354. The second relay 354 is configured to be connected in parallel to the second resistor 352. The second relay 354 is opened by the control unit 8 when the predetermined boost condition is satisfied, and when the second relay 354 is open, the first resistor 351, the second resistor 352, and the third resistor 353 set the voltage-divide changing circuit 356 so that the first boost voltage Vb1 becomes larger than the rated voltage of the battery 3.

As a result, the voltage-divide circuit 350 including the voltage-divide changing circuit 356 can be configured at low cost by the first resistor 351, the second resistor 352, the third resistor 353, and the second relay 354. In addition, the voltage-divide ratio can be easily changed by the second relay 354. Note that, since the first resistor 351, the second resistor 352, and the third resistor 353 are not connected in parallel to each other regardless of whether the second relay 354 is closed or opened, it is not necessary to consider a combined resistor in a case where they are connected in parallel, and it is easier to configure the circuit.

Note that the second relay 354 may be provided in parallel to the first resistor 351 instead of to the second resistor 352. In this case, the first boost voltage Vb1 and the second boost voltage Vb2 according to the above embodiment can be achieved by setting the resistance value R41 of the first resistor 351 to 68 kΩ, setting the resistance value R42 of the second resistor 352 to 130 kΩ, and setting the resistance value R43 of the third resistor 353 to 20 kΩ. Specifically, when the second relay 354 is open, the voltage output from the backup power supply 6 can be boosted to the first boost voltage Vb1. When the second relay 354 is closed, the voltage output from the backup power supply 6 can be boosted to the second boost voltage Vb2.

Note that the vehicle power supply device according to the present invention is not limited to the configuration of the above embodiment, and various modifications can be made.

In each of the above embodiments, the normally closed type or normally open type relay is used in accordance with the closed/open state of the second relay when boosting to the first boost voltage Vb1, but it is not limited thereto. For example, in a configuration in which the second relay is closed when boosting to the first boost voltage Vb1, a normally open type second relay may be used, and the second relay may be controlled to be closed by a control signal from the control unit 8 when boosting to the first boost voltage Vb1.

Further, a transistor may be employed instead of the first relay and/or the second relay as the switching element.

In the above embodiment, the predetermined boost condition is a case where both the condition that the vehicle is not in a collision state and the condition that the battery 3 is normal are satisfied, but instead of this, it may be determined that the predetermined boost condition is satisfied when at least one of the condition that the vehicle is not in a collision state or the condition that the battery 3 is normal is satisfied.

In the above embodiment, the vehicle power supply device that controls the power supply to the door latch device has been described as an example, but it is not limited thereto. The vehicle power supply device can be applied to a vehicle-mounted device that operates by being supplied with power, for example, a vehicle-mounted device including an electric motor, and can also be used for supplying power to an electric motor, an electromagnetic valve, and the like used for, for example, a power window, an electric tailgate, an electric fuel lid cap, an electric slide door, and the like.

The invention claimed is:

1. A vehicle power supply device comprising:

a backup power supply to which power is supplied from a battery mounted in a vehicle;

a boost unit that boosts a voltage of the backup power supply to a boost voltage;

a motor drive unit that is connected to the battery and the boost unit and is capable of driving an electric motor by being supplied with power from either the battery or the boost unit, whichever has a higher voltage; and a control unit that controls operation of the boost unit, wherein when it is determined that a predetermined boost condition, which includes whether or not the voltage of the battery is normal, is satisfied, the control unit controls the boost unit to boost the voltage of the backup power supply to a voltage higher than a rated voltage of the battery and thus the motor is supplied with power from the backup power supply, and when it is determined that the predetermined boost condition is not satisfied, the control unit controls the boost unit to boost the voltage of the backup power supply to a voltage lower than the rated voltage of the battery and equal to or higher than a minimum operating voltage of the electric motor and thus the motor is supplied with power from the backup power supply.

2. The vehicle power supply device according to claim 1, wherein the boost unit includes a boost circuit that boosts a voltage of the backup power supply to the boost voltage, and a voltage-divide circuit that divides the boost voltage, the boost circuit receives an input of a voltage divided by the voltage-divide circuit as a feedback voltage, and adjusts the boost voltage so that the feedback voltage becomes a predetermined voltage, and the voltage-divide circuit includes a voltage-divide changing circuit configured to be capable of changing a voltage-divide ratio.

3. The vehicle power supply device according to claim 2, wherein the voltage-divide circuit includes a first resistor having one end connected to an output terminal of the boost circuit and another end connected to an input terminal of the boost circuit, and a second resistor having one end connected to the another end of the first resistor and another end grounded, the voltage-divide changing circuit includes a switching circuit in which a third resistor and a switching element are connected in series, and the switching circuit is configured to be connected in parallel to the second resistor, the switching element is closed by the control unit when the predetermined boost condition is satisfied, and the first resistor, the second resistor, and the third resistor set the voltage-divide changing circuit so that the boost voltage becomes larger than the rated voltage of the battery when the switching element is closed.

4. The vehicle power supply device according to claim 2, wherein the voltage-divide circuit includes a first resistor having one end connected to an output terminal of the boost circuit and another end connected to an input terminal of the boost circuit, and a second resistor having one end connected to the another end of the first resistor and another end grounded, the voltage-divide changing circuit includes a switching circuit in which a third resistor and a switching element are connected in series, and the switching circuit is configured to be connected in parallel to the first resistor, the switching element is opened by the control unit when the predetermined boost condition is satisfied, and the first resistor, the second resistor, and the third resistor set the voltage-divide changing circuit so that the boost voltage becomes larger than the rated voltage of the battery when the switching element is open.

5. The vehicle power supply device according to claim 2, wherein the voltage-divide circuit includes a first resistor having one end connected to an output terminal of the boost circuit and another end connected to an input terminal of the boost circuit, and a second resistor having one end connected to the another end of the first resistor, and a third resistor having one end connected to another end of the second resistor and another end grounded, the voltage-divide changing circuit includes a switching element, and the switching element is configured to be connected in parallel to one of the second resistor and the third resistor, the switching element is closed by the control unit when the predetermined boost condition is satisfied, and the first resistor, the second resistor, and the third resistor set the voltage-divide changing circuit so that the boost voltage becomes larger than the rated voltage of the battery when the switching element is closed.

6. The vehicle power supply device according to claim 2, wherein the voltage-divide circuit includes a first resistor having one end connected to an output terminal of the boost circuit, a second resistor having one end connected to another end of the first resistor and another end connected to an input terminal of the boost circuit, and a third resistor having one end connected to the another end of the second resistor and another end grounded, the voltage-divide changing circuit includes a switching element, and the switching element is configured to be connected in parallel to one of the first resistor and the second resistor, the switching element is opened by the control unit when the predetermined boost condition is satisfied, and the first resistor, the second resistor, and the third resistor set the voltage-divide changing circuit so that the boost voltage becomes larger than the rated voltage of the battery when the switching element is open.

7. The vehicle power supply device according to claim 1, wherein the control unit is configured to receive at least one of a collision signal indicating that the vehicle has collided or a battery state signal with which it is possible to determine a state of the battery, and the predetermined boost condition is satisfied when the control unit does not receive the collision signal and when the control unit determines that the battery is not in a failure state or not in a cutoff state based on the battery state signal.

8. A door latch device comprising:

the vehicle power supply device according to claim 1;

a fork rotatable between a latch position where the fork is in engagement with a striker on a vehicle-body-side and an open position where the engagement is released; and a claw rotatable between a locking position where the fork is hold at the latch position and a locking release position at which the holding is released, wherein the claw is rotationally driven by an electric motor supplied with power by the vehicle power supply device.

* * * * *